United States Patent
Veca et al.

(10) Patent No.: US 10,927,582 B2
(45) Date of Patent: Feb. 23, 2021

(54) MOTOR-VEHICLE SEAL WITH INTEGRATED ANTI-PINCHING SYSTEM

(71) Applicant: C.R.F. Società Consortile per Azioni, Orbassano (IT)

(72) Inventors: Antonino Domenico Veca, Casalborgone (IT); Paolo Chiappero, Cavour (IT); Graziano Brocani, Volpiano (IT); Vito Guido Lambertini, Giaveno (IT)

(73) Assignee: C.R.F. SOCIETA CONSORTILE PER AZIONI, Orbassano (IT)

( * ) Notice: Subject to any disclaimer, the term of this patent is extended or adjusted under 35 U.S.C. 154(b) by 107 days.

(21) Appl. No.: 15/830,960

(22) Filed: Dec. 4, 2017

(65) Prior Publication Data
US 2018/0305966 A1 Oct. 25, 2018

(30) Foreign Application Priority Data
Apr. 21, 2017 (EP) .................................. 17167477

(51) Int. Cl.
*E05F 15/42* (2015.01)
*B60J 10/76* (2016.01)
(Continued)

(52) U.S. Cl.
CPC ............... *E05F 15/42* (2015.01); *B60J 10/15* (2016.02); *B60J 10/20* (2016.02); *B60J 10/76* (2016.02);
(Continued)

(58) Field of Classification Search
CPC .......... E05F 15/42; E05F 15/443; B60J 10/76
See application file for complete search history.

(56) References Cited

U.S. PATENT DOCUMENTS 4,943,757 A * 7/1990 Richter .................... B60J 10/00
                                                318/256
6,246,194 B1 * 6/2001 Davies .................. E05F 15/443
                                                318/264
(Continued)

FOREIGN PATENT DOCUMENTS

DE        19535796 A1   3/1996
EP         1741865 A2   1/2007
WO     2012/055934 A1   5/2012

OTHER PUBLICATIONS

European Search Report dated Oct. 26, 2017 for corresponding EP Application No. 17167477.3.

*Primary Examiner* — Gregory J Strimbu
(74) *Attorney, Agent, or Firm* — Heslin Rothenberg Farley & Mesiti P.C.; Victor A. Cardona, Esq.

(57) ABSTRACT

A seal for a movable part of a motor-vehicle includes at least one body formed of polymeric elastomeric material supplemented with carbon-based nanofillers. The body includes an outer surface having one or more piezo-resistive areas where the polymeric material supplemented with carbon-based nanofillers is piezo-resistive due to laser irradiation to define one or more electric deformation sensors activatable in response to a contact with a foreign body during the movement of the movable part of the motor-vehicle. The body also includes one or more conductive lines made locally electrically-conductive due to laser irradiation to define the one or more electrical connection lines connecting the electric deformation sensors to electrodes associated with the seal.

16 Claims, 4 Drawing Sheets

(51) Int. Cl.
  *B60J 10/20* (2016.01)
  *B60J 10/86* (2016.01)
  *B60J 10/15* (2016.01)
  *E05F 15/44* (2015.01)

(52) U.S. Cl.
  CPC ............ *B60J 10/86* (2016.02); *E05F 15/443* (2015.01); *E05F 2015/447* (2015.01); *E05Y 2400/552* (2013.01); *E05Y 2900/55* (2013.01)

(56) References Cited

U.S. PATENT DOCUMENTS

| | | | | |
|---|---|---|---|---|
| 6,571,511 | B1* | 6/2003 | Plottnik | B60J 10/00 200/61.44 |
| 7,893,831 | B2* | 2/2011 | Hoshina | E05F 15/42 29/897.312 |
| 8,627,600 | B2* | 1/2014 | Gao | E06B 9/80 49/26 |
| 2003/0051561 | A1* | 3/2003 | Weiss | G01L 1/205 73/862.046 |
| 2005/0166680 | A1* | 8/2005 | Ogino | B60J 10/00 73/703 |
| 2007/0007068 | A1* | 1/2007 | Weingaertner | E05F 15/42 180/274 |
| 2013/0255997 | A1* | 10/2013 | Zecchina | H05K 3/105 174/250 |
| 2017/0328112 | A1* | 11/2017 | Okada | E05F 15/40 |

\* cited by examiner

MOTOR-VEHICLE SEAL WITH INTEGRATED ANTI-PINCHING SYSTEM

CROSS REFERENCE TO RELATED APPLICATIONS

This application claims priority to European Patent Application No. 17167477.3 filed on Apr. 21, 2017, the entire disclosure of which is incorporated herein by reference.

This application is also related to U.S. Pat. No. 10,493,814, entitled "ELASTIC SUPPORT WITH AN INTEGRATED LOAD SENSOR FOR SUSPENSION SYSTEMS OF A MOTOR-VEHICLE".

This application is also related to U.S. Pat. No. 10,737,549, entitled "TUBE MADE OF ELASTOMERIC MATERIAL FOR A SYSTEM WHICH IS ON-BOARD OF A MOTOR-VEHICLE".

FIELD OF THE INVENTION

The present invention relates to electrically-operated sealing and/or guiding seals for a motor-vehicle window or other movable part of a motor-vehicle.

PRIOR ART

The safety during the operation of electrically-operated movable parts is an issue particularly felt by motor-vehicle manufacturers, in order to avoid undesired pinching of users or other unrelated bodies. To date, for example, in the case of electrically-operated motor-vehicle windows, systems are used based on the absorption of current of the electrically-operated motor of the motor-vehicle window, or systems based on conductive electrical contacts on the guiding seal of the motor-vehicle window. However, the solutions currently on the market have poor reliability, whereby they can cause false alarms of pinching occurrence and/or are relatively complex and expensive.

The same Applicant has proposed, in the document WO 2012/055934 A1, a method for producing conductive and/or piezo-resistive traces in a non-conductive polymeric substrate, by means of laser irradiation, wherein said substrate is a composite polymeric material, comprising a matrix with a non-carbonizing polymer following thermal degradation, and a dispersed phase comprising carbon nanotubes or carbon nitride or carbon nanofibers.

The present invention builds on the requirement to find an advantageous application of this method for producing a seal with an integrated anti-pinching system, for a motor-vehicle window or other types of movable parts of motor-vehicles with a motorized movement system, such as sunroofs, sliding side doors or rear doors of the motor-vehicle.

OBJECT OF THE INVENTION

One object of the present invention is therefore to produce a sealing and/or a guiding seal for a motor-vehicle window or other movable part of a motor-vehicle that exploits the possibilities offered by the method proposed by the Applicant in the document WO 2012/055934 A1, in an advantageous manner.

Another object of the invention is that of achieving the aforesaid objective by means of a component that, on one hand is simple and economic to construct, and on the other hand having characteristics that are extremely reliable in the case of pinching with an unrelated body during the movement of the movable part.

SUMMARY OF THE INVENTION

In view of achieving the aforesaid objects, the present invention aims to provide a sealing and/or guiding seal for a motor-vehicle window or other movable part of a motor-vehicle, characterized in that it comprises at least one body formed of polymeric elastomeric material supplemented with carbon-based nanofillers, said body including:

an outer surface with one or more piezo-resistive areas where the polymeric material supplemented with carbon-based nanofillers has been made locally piezo-resistive by laser irradiation, so as to define one or more electric deformation sensors capable of detecting interference with an unrelated body during the movement of said movable part of a motor-vehicle, and one or more conductive paths where said polymeric material supplemented with carbon-based nanofillers has been made locally electrically-conductive by laser irradiation, so as to define one or more electrical connection lines of the said piezo-resistive areas, with electrodes associated with said seal.

Thanks to these characteristics, the seal according to the present invention integrates the anti-pinching function within the seal itself, without having to use an additional sensor or having to resort to logic circuitry susceptible to false alarms of pinching.

In a preferred embodiment of the invention, the movable part of the motor-vehicle is a vertically-movable, electrically-operated motor-vehicle window of a side door of a motor-vehicle.

Preferably, the body of the seal is channel-shaped, with a central portion, an outer wing, intended to face towards the motor-vehicle exterior, and an inner wing, intended to face towards the motor-vehicle interior, and extending further downwards than said outer wing. The seal presents a plurality of said piezo-resistive areas distributed along the length of the seal, at least at a lower end edge of said inner wing.

The present invention is also directed to a motor-vehicle, comprising a seal of the type indicated above, and an electronic control unit configured to monitor the electrical resistance of one or more electrically-conductive paths including the aforesaid piezo-resistive areas and to generate an alarm signal when the measured electrical resistance deviates from a predetermined value.

Further characteristics and advantages of the invention will become apparent from the following description and the attached claims.

DETAILED DESCRIPTION OF THE EMBODIMENTS OF THE INVENTION

The attached drawings are provided purely by way of non-limiting example, wherein.

Figure 1:
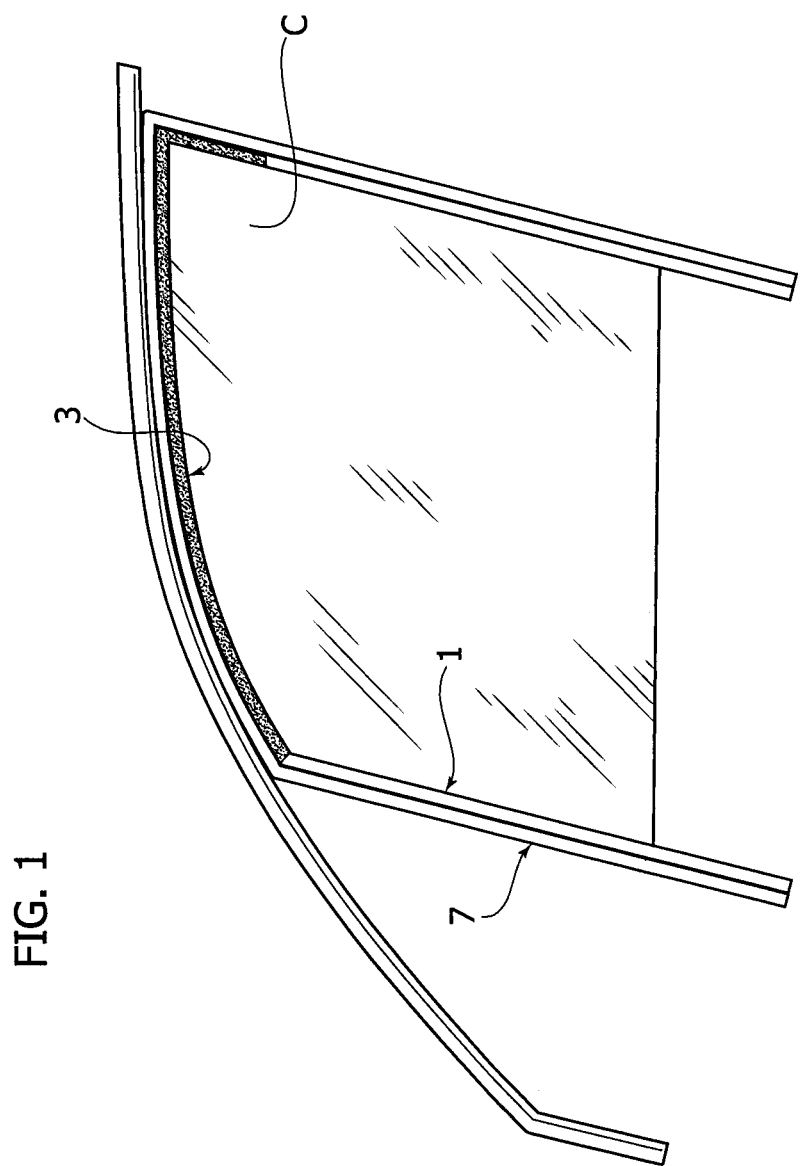
FIG. 1 is a schematic side view of a motor-vehicle side door with a seal according to the present invention.
Figure 7:
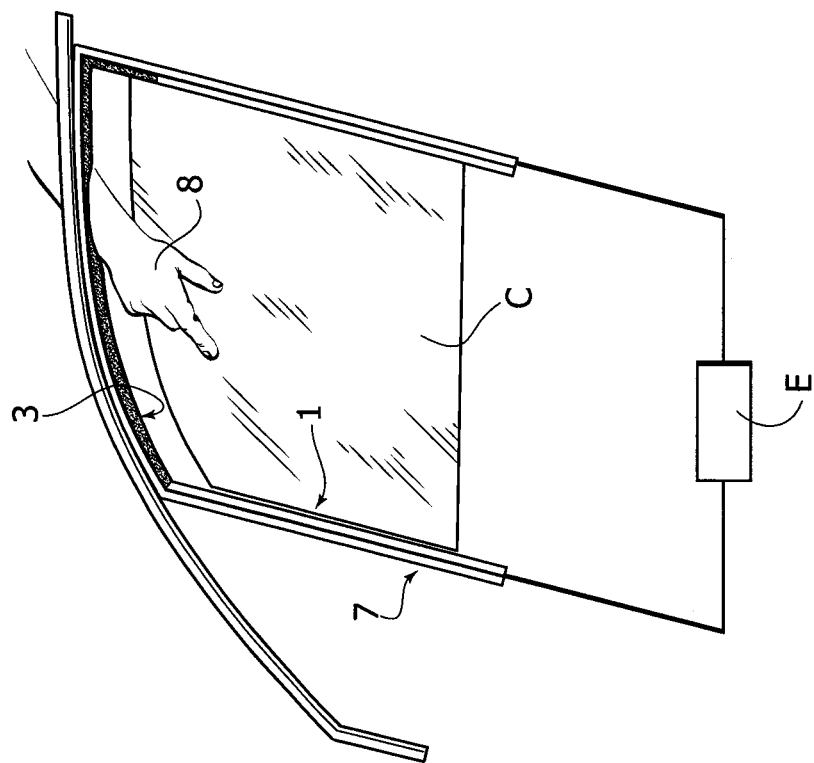
FIG. 6 is an additional schematic side view illustrating the details of FIG. 1 with the body spaced from the seal and FIG. 7 is additional schematic side view illustrating the details of FIG. 1 with the body engaged with the seal.
Figure 6:
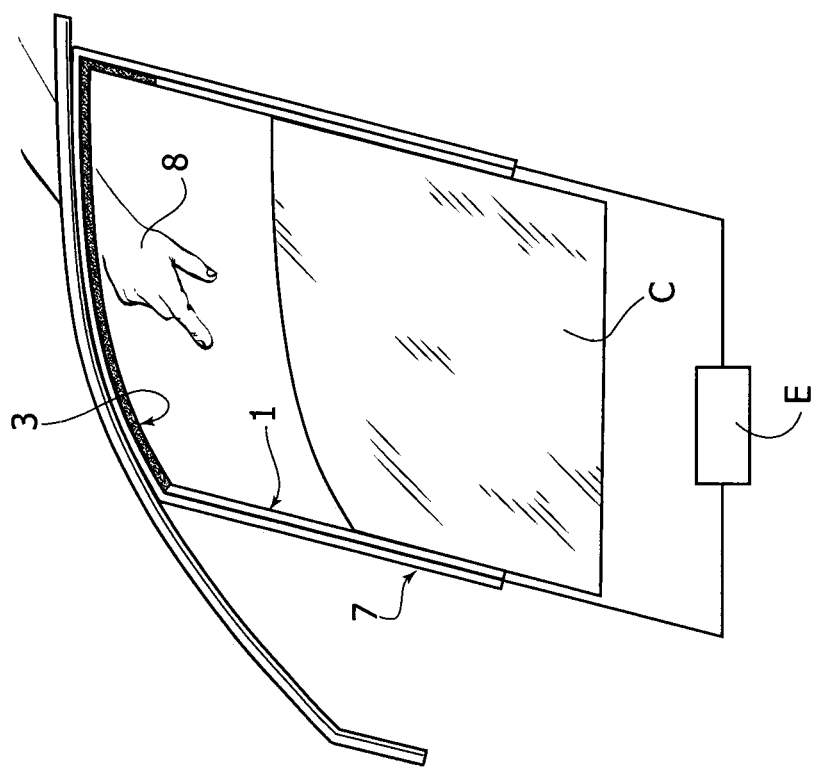

In the attached drawings, reference 1 indicates a sealing and/or guiding seal according to the present invention, for a movable part of a motor-vehicle. In the embodiment illustrated in the drawings, the seal 1 is associated with a vertically-movable, electrically-operated motor-vehicle window C of a motor-vehicle side door 7 (FIGS. 1, 6, 7). However, this specific embodiment is not to be considered in any way limitative since the seal according to the present invention can also be associated with other types of movable parts of motor-vehicles with a motorized movement system, such as an openable sunroof, a sliding side door or a rear boot/hatchback.

According to an essential characteristic of the present invention, the seal 1 has a body 2 formed of polymeric elastomeric material having functionalized portions consisting of a polymeric material supplemented with carbon-based nanofillers (FIG. 4) according to the disclosures of the document WO2012/055934 A1 by the same Applicant.

In the known method of this document, a polymeric-based material is supplemented with carbon-based nanofillers, such as carbon nanotubes or carbon nitride or carbon nanofibers, in an amount insufficient to make the material electrically-conductive. In the embodiment illustrated in the drawings, and in particular with reference to FIG. 5, which shows a step of the production method of the seal according to the invention, an outer surface 3 along the longitudinal extension of the seal 1 is subjected to the known method of WO 2012/055934 A1. This method envisages directing a laser beam L emitted by a laser head H over the polymeric material of the seal 1 in order to make the outer surface 3 of the seal 1 electrically-conductive along one or more paths 6, where the laser beam causes a carbonization of the material.

Figures 4, 5:
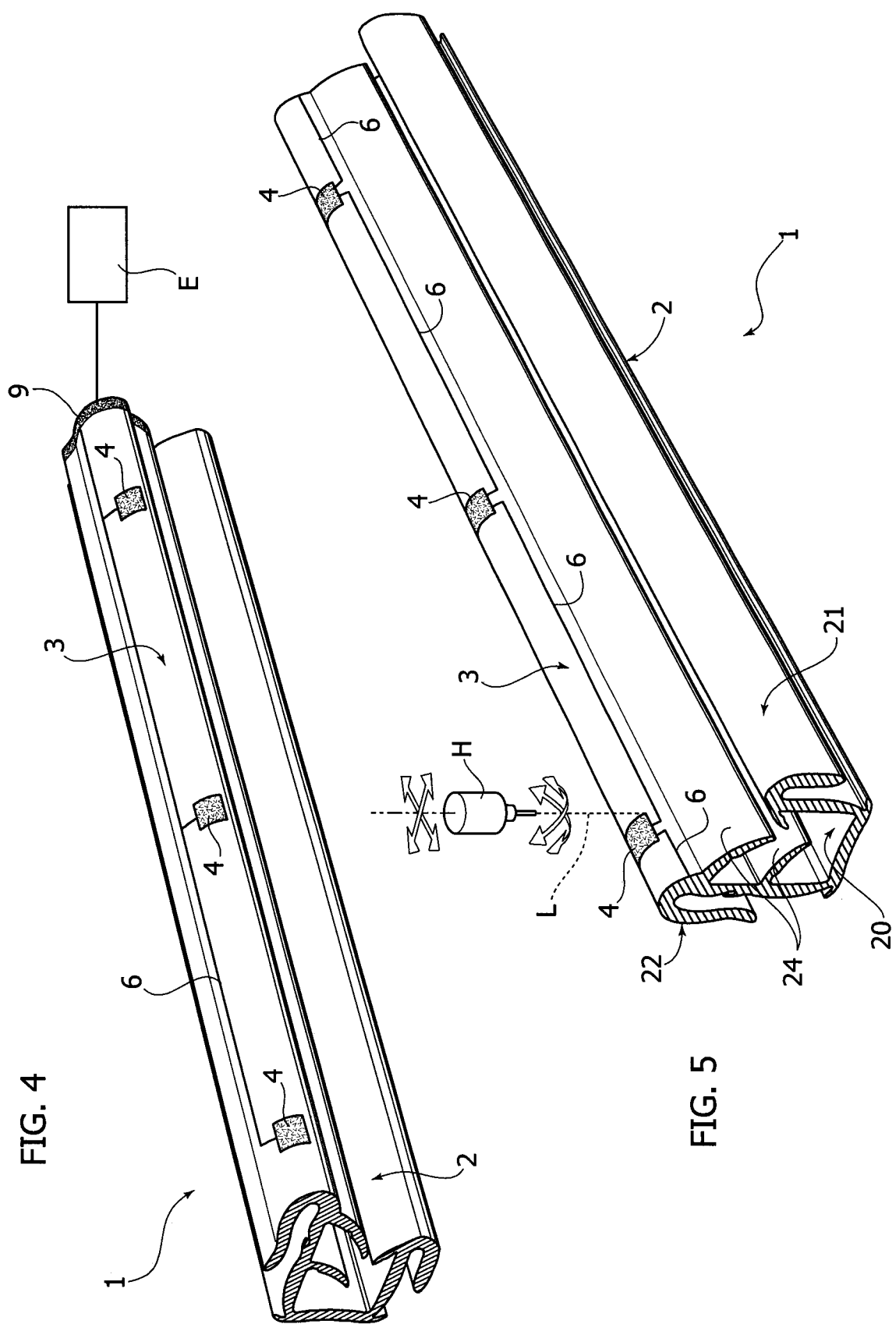
FIG. 4 illustrates a schematic perspective view of the seal of the preceding figures.
FIG. 5 is a schematic view that illustrates a step of the production method of the seal according to the invention.

FIG. 5 shows schematically a laser head H movable according to two orthogonal directions X, Y and also equipped with means for pivoting the laser beam L in one plane or two orthogonal planes. The schematically illustrated embodiment of FIGS. 4 and 5 is provided purely as an indication, being possible to envisage that, alternatively, the seal 1 moves relative to the laser head H, or to envisage a combination of movements of the seal 1 and the laser head H. The details relative to the base material, the type of nanofillers, the type of usable laser, and the means for moving the laser head H are not illustrated here, for greater simplicity and clarity, since such details, taken in their own right, do not fall within the scope of the present invention and are achievable in any known manner, according to the disclosures contained in the document WO 2012/055934 A1.

According to another characteristic of the invention, the laser irradiation on the outer surface 3 of the seal 1 is carried out in such a way so as to form, in addition to the conductive paths 6, a plurality of piezo-resistive areas 4 (FIGS. 4 and 5) connected to the electrically-conductive lines 6. In the embodiment illustrated in FIG. 5, the piezo-resistive areas 4 are electrically connected to each other in series, but alternatively, may also be connected to each other in parallel. The sensorized surface 3 provided with piezo-resistive areas 4 and the conductive paths 6 also present, at each end, a metal terminal with electrodes 9 (FIG. 4). The piezo-resistive areas 4 arranged along the surface 3 of the seal 1 define one or more electric deformation sensors, activatable by exerting a localized pressure on the outer surface 3 of the seal 1.

Figure 3:
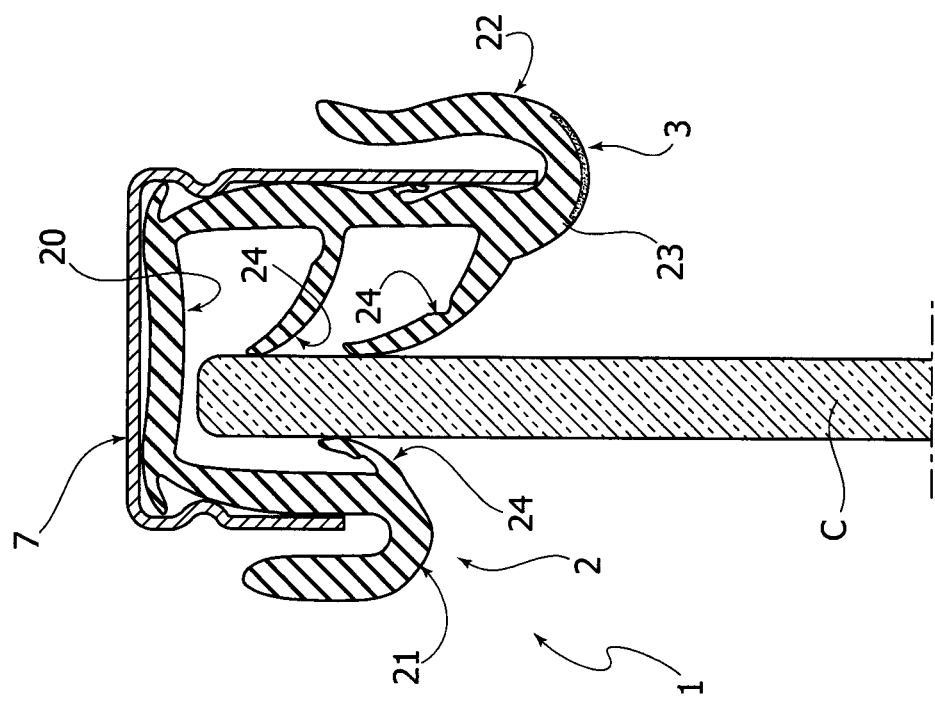
FIG. 2 illustrates a cross-section view of the door and the seal illustrated in FIG. 1 with the window spaced from the seal and FIG. 3 illustrates a cross-section view of the door and the seal illustrated in FIG. 1 with the window engaging the seal.
Figure 2:
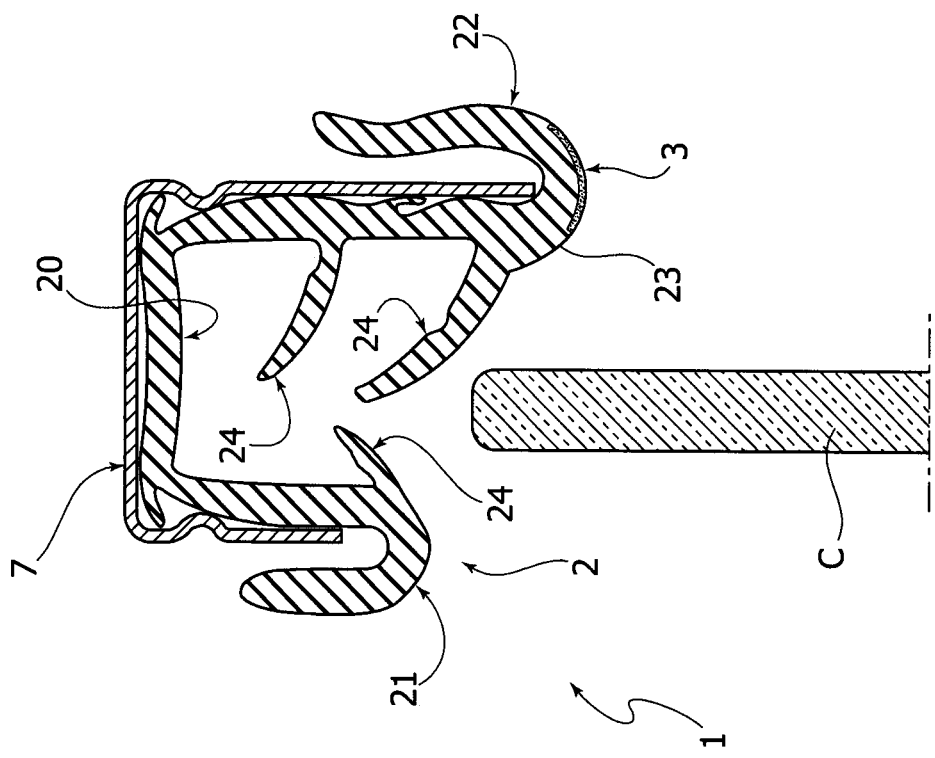

With reference to the embodiment illustrated in the drawings, and in particular in the cross-section views of FIGS. 2 and 3, the body 2 of the seal is channel-shaped. In fact, the body 2 presents a central portion 20, an outer wing 21, intended to face towards the motor-vehicle exterior, and an inner wing 22 intended to be face towards the motor-vehicle interior. The inner wing 22 extends further downwards with respect to the outer wing 21, and furthermore, the seal 1 has a plurality of central wings 24 configured for improving the sealing function of the seal 1. In this embodiment, the outer surface 3 sensorized with piezo-resistive areas 4 is located at a lower end edge 23 of the inner wing 22.

Thanks to the surface 3 provided with the piezo-resistive areas 4 described above, the seal 1 according to the present invention has an integrated system for detecting the pinching of an unrelated body 8 between the seal 1 and the motor-vehicle window C during the movement of the latter (FIGS. 6, 7).

The pressure exerted on the areas 4 after the pinching generates an electrical signal that is transmitted through the conductive paths 6 to the terminals 9, and from these to an electronic control unit E (FIGS. 4, 6, 7) of the motor-vehicle on which the seal according to the invention is installed.

The electronic control unit E can be programmed to generate an alarm signal if the measured electrical resistance deviates from a predetermined threshold value following pinching with an unrelated body 8 during the movement of the motor-vehicle window C (FIGS. 6 and 7).

Thanks to the characteristics described above, the seal according to the present invention advantageously exploits the possibilities offered by the method proposed by the Applicant in the document WO 2012/055934 A1, by means of producing an object that is simple and economical to construct, but at the same time being extremely reliable in the case of pinching with an unrelated body during the movement of the movable part on which the seal is installed.

Of course, without prejudice to the principle of the invention, the details of construction and the embodiments may vary widely with respect to those described and illustrated purely by way of example, without departing from the scope of the present invention.

What is claimed is:

1. A seal anti-pinching system for a window of a motor-vehicle, the system comprising:
   a sealing body formed of polymeric elastomeric material supplemented with carbon-based nanofillers, said body including:
      an outer surface having one or more piezo-resistive areas, said one or more piezo-resistive areas being formed by the polymeric material supplemented with carbon-based nanofillers being laser irradiated, said one or more piezo-resistive areas defining one or more electric deformation sensors activatable in response to a contact with a foreign body at least during a movement of the window of the motor-vehicle;
      said outer surface comprising one or more electrical connection lines being electrically conductive due to the polymeric material supplemented with carbon-based nanofillers being laser irradiated, said one or more electrical connection lines connecting the one or more electric deformation sensors to electrodes of said seal anti-pinching system;
   said one or more deformation sensors and said one or more connection lines being integral portions of said body;

the body being channel-shaped and comprising a central portion between an inner wing and an outer wing, said outer wing intended to face toward an exterior of the motor-vehicle, and said inner wing intended to face toward an interior of the motor-vehicle;

said one or more deformation sensors being distributed along a length of a lower end edge of said inner wing;

an electronic control unit configured to monitor an electrical resistance of said one or more electrical connection lines connecting said one or more deformation sensors and to generate an alarm signal when the electrical resistance deviates from a predetermined value in response to the contact with the foreign body at least during the movement of the window of the motor-vehicle.

2. The seal anti-pinching system according to claim 1, wherein said window is a vertically-movable electrically-operated window of a side door of the motor-vehicle.

3. The seal anti-pinching system according to claim 2, wherein said one or more electric deformation sensors comprises a plurality of said deformation sensors which are connected electrically to each other in series.

4. The seal anti-pinching system according to claim 2, wherein said one or more electric deformation sensors comprises a plurality of said deformation sensors which are connected electrically to each other in parallel.

5. The seal anti-pinching system according to claim 1, wherein said one or more deformation sensors comprise a plurality of said deformation sensors which are connected electrically to each other in series.

6. A motor-vehicle, comprising the system according to claim 5.

7. The seal anti-pinching system according to claim 1, wherein said one or more deformation sensors comprise a plurality of said deformation sensors which are connected electrically to each other in parallel.

8. A motor-vehicle, comprising the system according to claim 7.

9. The seal anti-pinching system of claim 1 wherein said outer wing is not laser-irradiated and lacks a sensor to detect the contact with the foreign object.

10. The seal anti-pinching system of claim 1 wherein the central portion comprises a plurality of wings for sealing the window.

11. The seal anti-pinching system of claim 1 wherein said body is received in a door of the motor-vehicle and said one or more piezo-resistive areas extends past said door into an interior of the motor-vehicle when the door is closed.

12. A motor-vehicle, comprising the system according to claim 1.

13. A door or hatchback comprising the system according to claim 1.

14. A door or hatchback comprising the system according to claim 2.

15. A door or hatchback comprising the system according to claim 5.

16. A door or hatchback comprising the system according to claim 7.

* * * * *